United States Patent
Hille et al.

(10) Patent No.: US 6,925,826 B2
(45) Date of Patent: Aug. 9, 2005

(54) MODULAR BUS AIR CONDITIONING SYSTEM

(75) Inventors: Andreas Hille, Renningen (DE); Robert C. Reimann, LaFayette, NY (US); Belin Czechowicz, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 267 days.

(21) Appl. No.: 10/429,481

(22) Filed: May 5, 2003

(65) Prior Publication Data

US 2004/0221596 A1 Nov. 11, 2004

(51) Int. Cl.[7] .............................................. B60H 1/32
(52) U.S. Cl. ...................... 62/244; 62/323.3; 62/DIG. 6
(58) Field of Search .......................... 62/239, 244, 298, 62/DIG. 16; 165/64; 392/347, 349, 350, 360

(56) References Cited

U.S. PATENT DOCUMENTS

| | | | | |
|---|---|---|---|---|
| 4,870,833 A | * | 10/1989 | Matsuda et al. | 62/134 |
| 6,295,826 B1 | * | 10/2001 | Lee | 62/244 |
| 6,494,052 B1 | * | 12/2002 | Lee | 62/244 |

* cited by examiner

*Primary Examiner*—William E. Tapolcai
(74) *Attorney, Agent, or Firm*—Wall Marjama & Bilinski LLP

(57) ABSTRACT

A module for a bus rooftop air conditioner is self contained in that it has all the necessary components including a compressor, if desired, which when supplied with electrical power, can provide conditioned air to the passenger compartment of a bus. In addition, an electrically powered heater is provided in the air flowstream such that heated air can also be supplied to the passenger compartment when desired. Multiple units provide for incremental capacity requirements to be met as well as limp home capabilities.

9 Claims, 9 Drawing Sheets

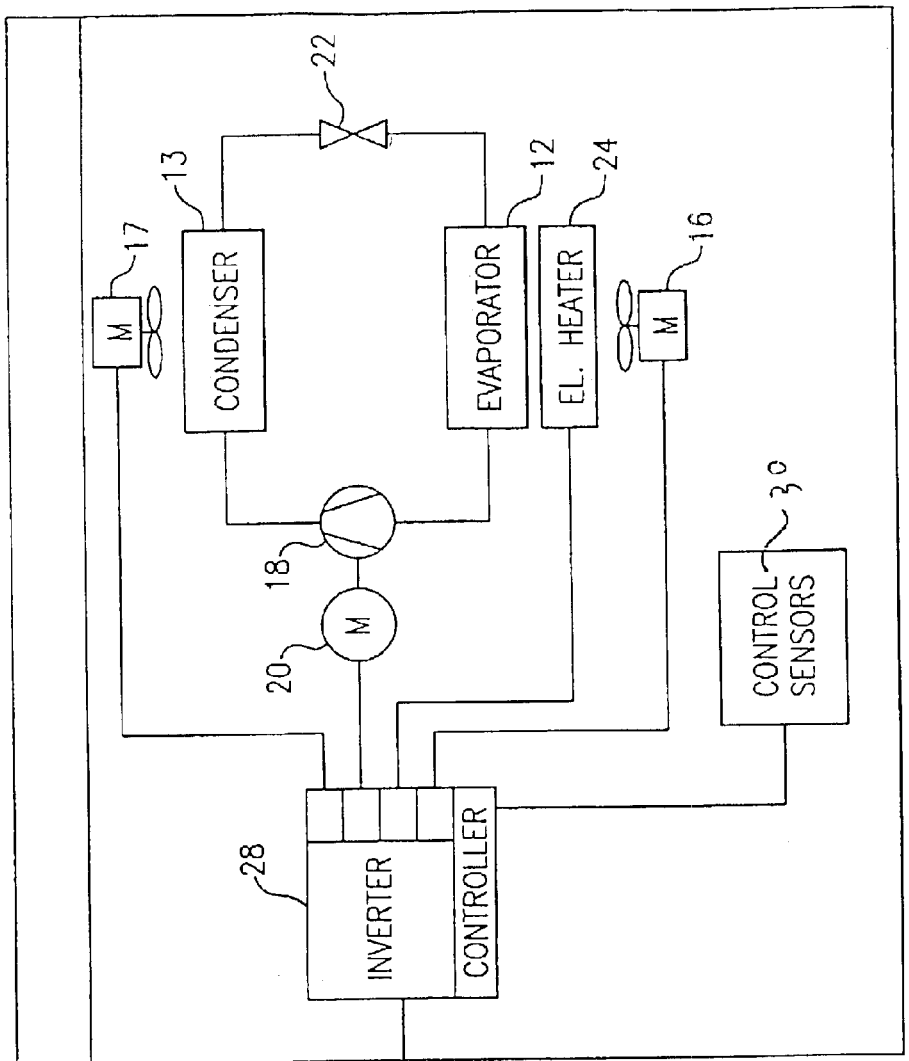
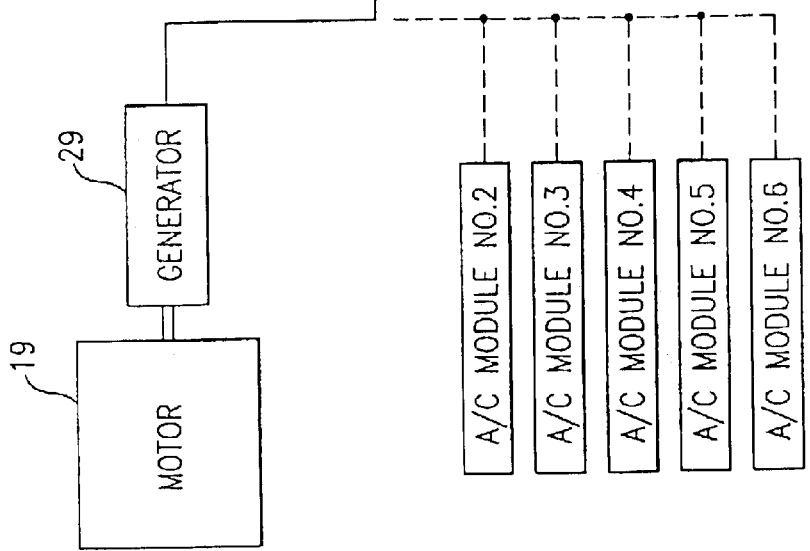
FIG.3

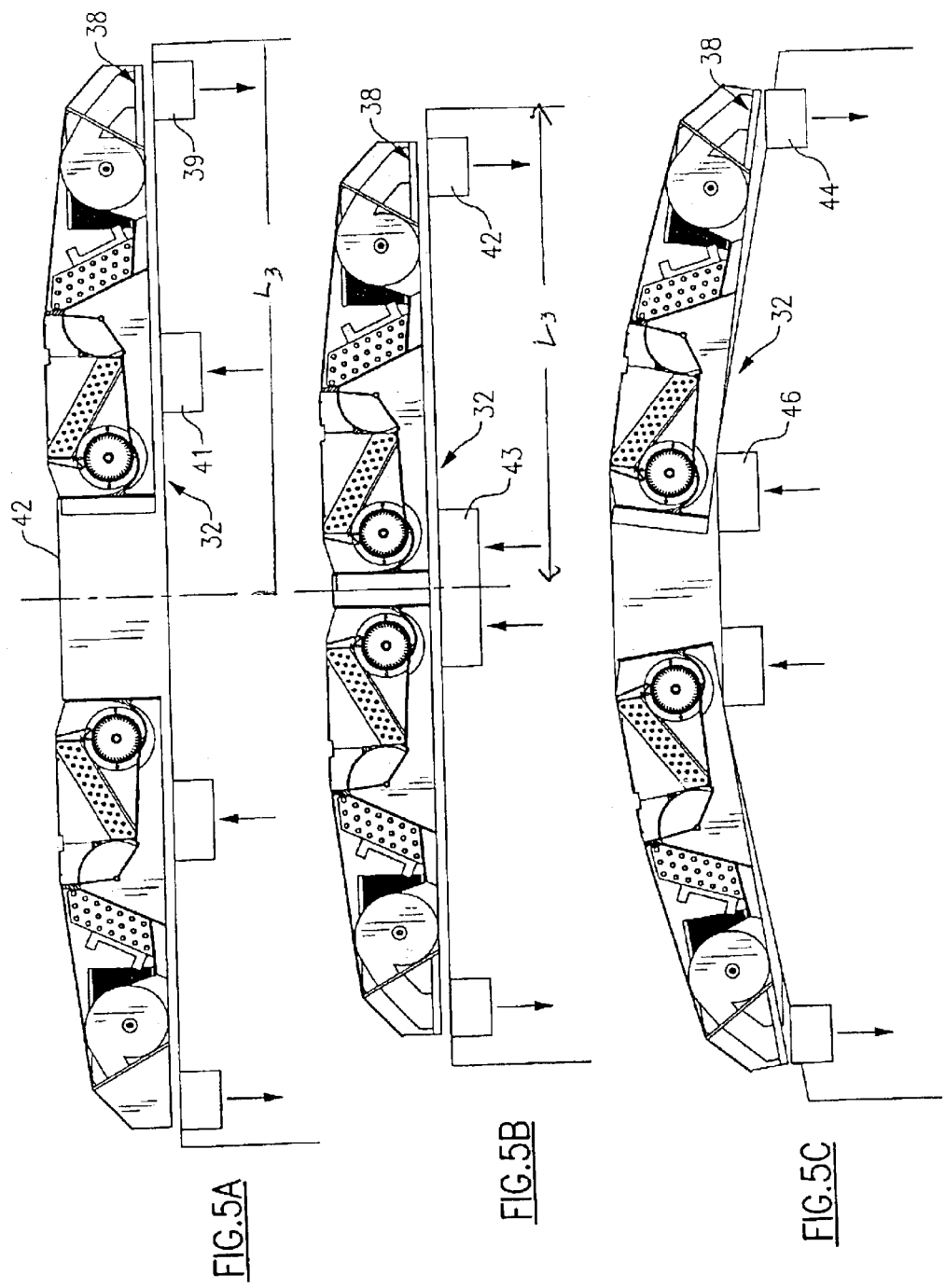

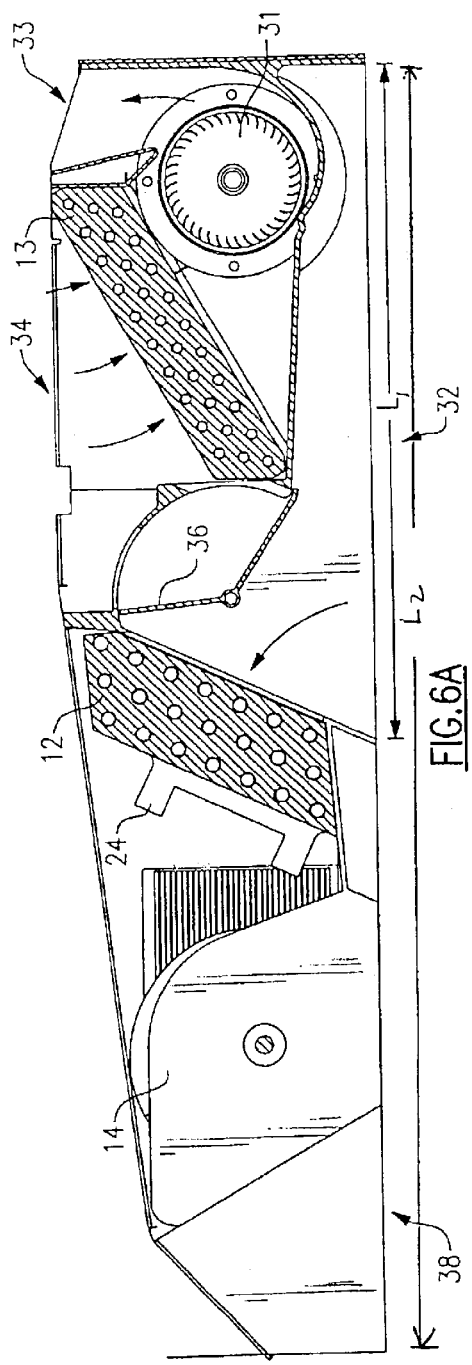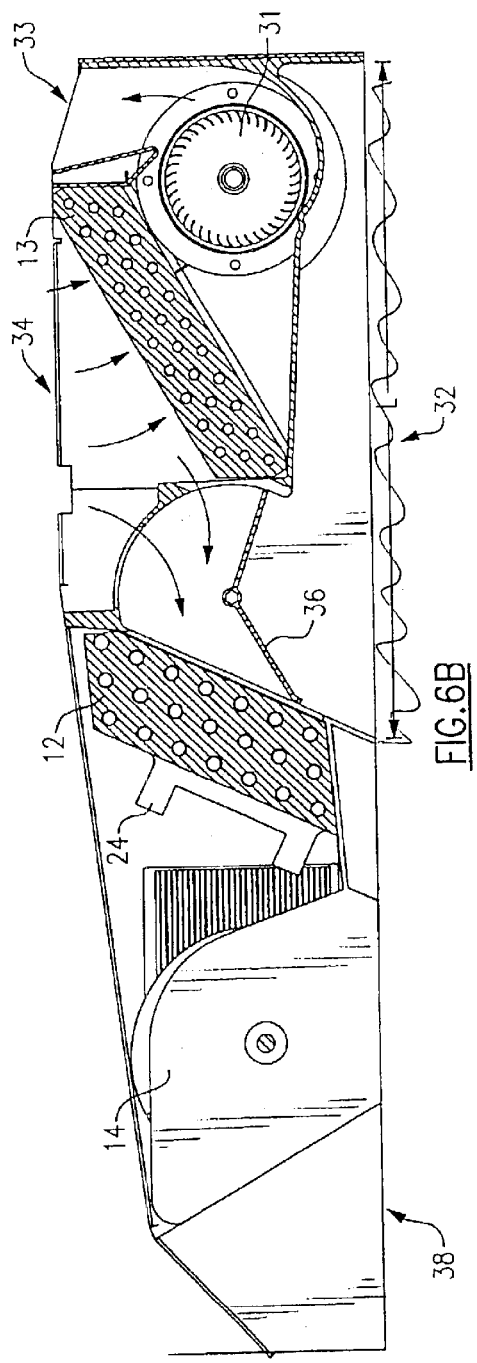

MODULAR BUS AIR CONDITIONING SYSTEM

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioning systems and, more particularly, to an air conditioning system for the rooftop of a bus.

The most common approach for air conditioning a bus is to locate the air conditioning components on the rooftop thereof. Inasmuch as power is available from the engine that drives the bus, it has become common practice to locate the air conditioning compressor near the drive engine such that the drive engine is drivingly connected to the compressor, with the compressor then being fluidly interconnected to the air conditioning system on a rooftop of a bus. This, of course, requires rather extensive piping between the engine compartment and the air conditioning unit, thereby increasing installation and maintenance costs.

Another problem with such existing systems is that the speed that the compressor is driven is dependent on the speed in which the drive engine is running. Thus, when the drive engine is idling in a parking lot, for example, the compressor is running at a relatively slow speed which may not be sufficient to provide the desired degree of air conditioning. It is therefore generally necessary to oversize the compressor in order to obtain the performance needed under these conditions.

Others problems associated with such a motor driven compressor system is that the open drive compressor needs a shaft seal and a mechanical clutch, both of which are subject to maintenance problems. Further, since DC power is available on a bus, DC motors have been used for the air conditioning system. In general, DC motors are not as reliable as AC motors since they have brushes that wear out, and brushless motors are relatively expensive.

In addition to the problems discussed hereinabove, it is recognized, that because the wide variety of bus types and application requirements, it has been necessary to provide many different types and variations of air conditioning systems in order to meet these different requirements and vehicle interfaces. As a result, the manufacturing and installation costs, and sustaining engineering resources that are necessary in order to properly maintain and service these units, are relatively high.

Also associated with the existing bus air conditioning systems is the problem of a component failure causing a complete loss of the air conditioning capacity. That is, with a single large unit as is now customary, failure of that unit such as, for example, a leaking hose causing loss of refrigerant, an electrical failure leading to inoperation of one of the components such as a fan, or a compressor failure, the entire unit is inoperable and no air conditioning can be provided to the unit. In such a situation, it would preferable if partial capacity could be maintained in order to provide a "limp home" capability.

In addition to the function of cooling the air in a passenger compartment of a bus, it is also necessary to warm the air when the ambient conditions are cold. Again, it is common to use the energy that is available at the drive engine, with the heat coming from the engine coolant. But, similar to the case of cooling, less heat will be available when the engine is idling, for example.

It is therefore an object of the present invention to provide an improved bus top air conditioning system.

Another object of the present invention is the provision for a bus air conditioning system which is effective at all operating speeds of the bus, while at the same time does not require an oversized compressor.

Yet another object of the present invention is the provision for reducing the manufacturing, installation, and maintenance costs of a bus air conditioning system.

Still another object of the present invention is that of providing an air conditioning system that is designed for adaptability of use in various types of installation configurations.

Another object of the present invention is that of providing a "limp home" capability in the event of certain component failures.

Still another object of the present invention is the provision in a rooftop air conditioning system for effectively providing heat to the passenger compartment, regardless of engine speed.

Yet another object of the present invention is the provision for a bus rooftop air conditioning system which is economical to manufacture and effective in use.

These objects and other features and advantages become more readily apparent upon reference to the following descriptions when taken in conjunction with the appended drawings.

SUMMARY OF THE INVENTION

Briefly, in accordance with one aspect of the invention, an air conditioning module is assembled with its condenser coil, evaporator coil and respective blowers located within the module and so situated that a standard module can accommodate various installation interfaces with different types and locations of return air and supply air ducts on a bus.

In accordance with another aspect of the invention, rather than a large single air conditioning unit, a plurality of relatively small identical modules can be installed on the roof of a bus, with each being capable of operating independently of the others so as to allow for the relatively low cost mass production of identical standardized units and also provide for a limp home capability in the event of failure of one or more units.

By yet another aspect of the invention, the modules may include a compressor, such that all the necessary refrigerant piping is located entirely on the module, with electrical power being provided to the electrical components on the module from a motor driven generator.

By another aspect of the invention, the evaporator section of the air conditioning unit has a relatively wide return air openings so as to be adaptable to use with any of the narrow body, wide body or curved top buses.

By still another aspect of the invention, heat is introduced into the air conditioning system by way of a heat resistance coil located in the air stream passing to the passenger compartment of the bus.

In the drawings as hereinafter described, a preferred embodiment is depicted; however various other modifications and alternate constructions can be made thereto without departing from the true sprit and scope of the invention.

BRIEF DESCRIPTION OF THE DRAWINGS

FIG. 3 is a schematic illustration of both a refrigeration circuit and an electrical circuit within a module in accordance with the present invention.

FIGS. 5A–5C are sectional views of modules as applied to various types of bus installations in accordance with a preferred embodiment of the invention.

FIGS. 6A–6C are sectional views of a module with an air mixing stops in various positions.

DESCRIPTION OF THE PREFERRED EMBODIMENT

Figure 1:
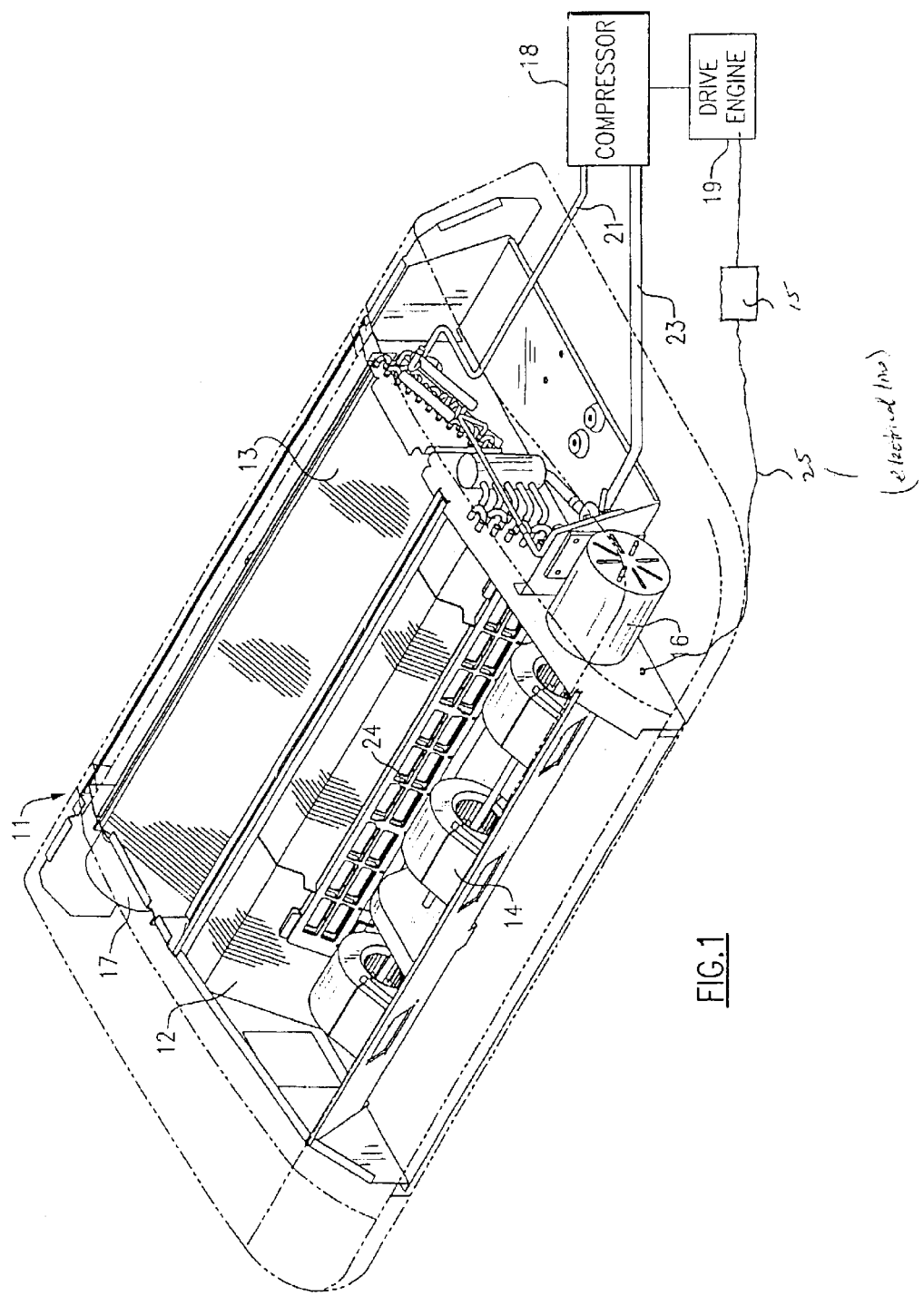
FIG. 1 is a perspective view of a module in accordance with a preferred embodiment of the invention.

FIG. 1 shows a module 11 with the cover removed to show the various components including an evaporator coil 12, a condenser coil 13, a plurality of evaporator blowers 14 and associated drive motors 16, and a condenser fan motor 17 for driving a condenser fan (see FIG. 3).

Outside the module 11 is a compressor 18 which is driven by a motor drive 19 to pump refrigerant from the compressor 18 through refrigerant line 21 to the condenser coil 13 and eventually to the evaporator coil 12 by way of an expansion valve 22 (see FIG. 3). The refrigerant vapor then passes back to the compressor 18 by way of refrigerant line 23.

The drive engine 19 is also operatively connected to an electrical generator 15, (or alternator, if desired) for providing electrical power to the module by way of line 25.

Also shown in FIG. 1 is an electrical resistance heater 24 which is downstream of the evaporator coil 12 such that, for periods of heating, the air is drawn by the evaporator blower 14 through the evaporator coil 12 and the heater 24 such that the air being delivered to the passenger compartment of the bus is heated. The electrical power to the heater 24, as well as to the evaporator blower motor 16 and the condenser fan motor 17, is provided by way of the electrical line 25 receiving DC power from the generator 15. The heater 24 can be powered by either DC or AC currents with the heat output being independent of the speed of the drive engine 19. With the module as shown in FIG. 1, DC power is available to power all of the motor components and is therefore preferred for the heater 24.

Figure 2:
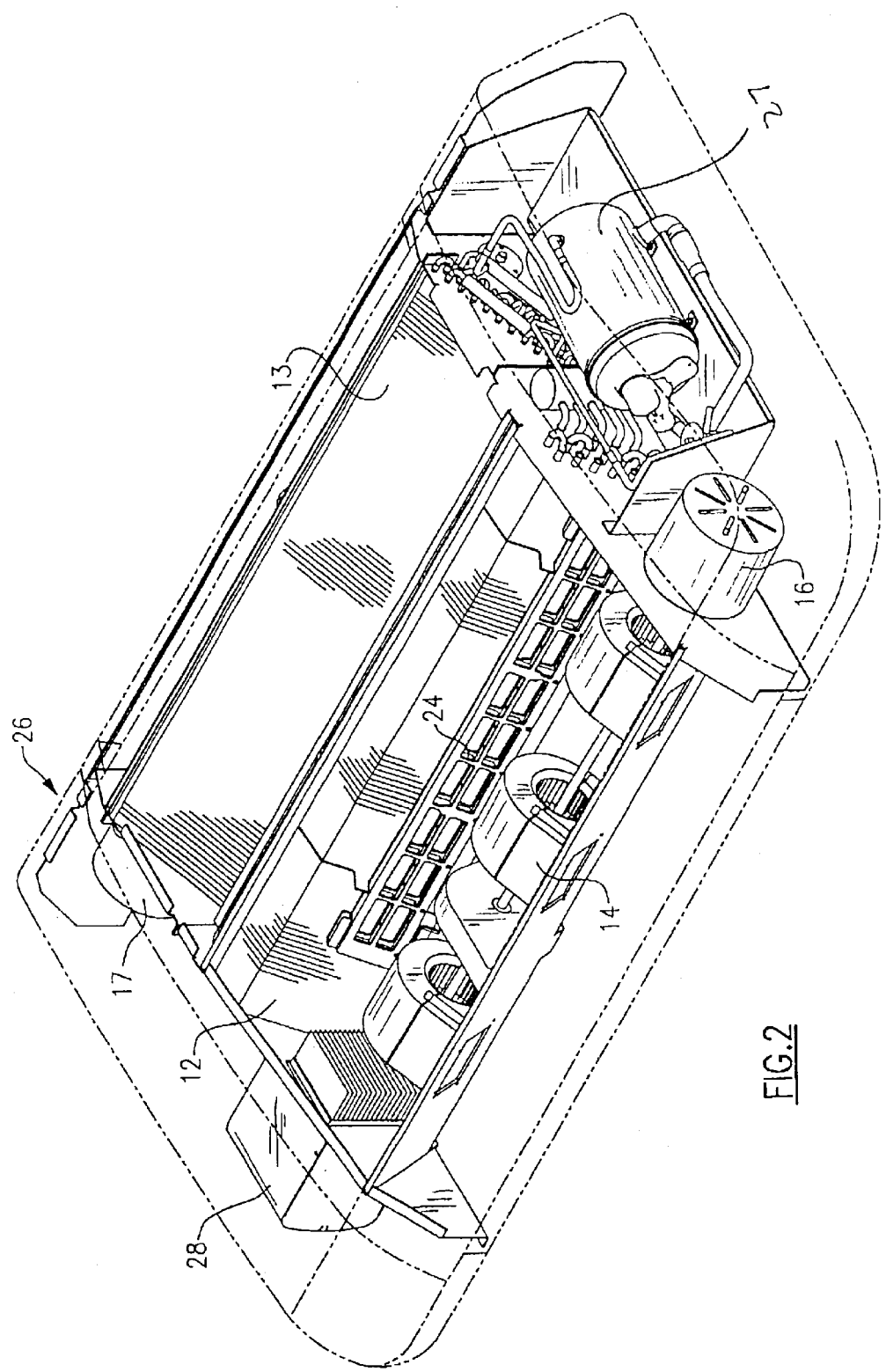
FIG. 2 is an alternative embodiment of the invention to include a compressor.

Referring now to FIG. 2, a modified module 26 is shown to include all of the components as described hereinabove. Further, it includes a horizontal rotary compressor 27 which is operatively interconnected between the evaporator coil 12 and the condenser coil 13 so as to circulate refrigerant in a manner similar as described hereinabove. The difference over the earlier described system, however, is that the hermetic compressor 18 is driven by an internal electric motor 20, with the power being provided by way of the generator 29, driven by the main engine 19, and an inverter/controller 28 as shown in FIG. 3. The inverter/controller 28, which receives input from various control sensors 30 and which includes a rectifier and an inverter, receives AC power from a generator or alternator 29 and provides, by way of the inverter, controlled AC power to the evaporator blower motor 16, the condenser blower motor 17, the compressor drive motor 20 and the heater 24. Since the invertor/controller 28 is capable of providing controlled AC power, each of the motors are AC motors, thereby ensuring a more maintenance free system.

With the inverter/controller providing controlled AC power, a preferred type of heat 24 is a positive temperature coefficient (PIC) heater wherein electrical resistance increases relatively fast as the temperature increases. Whereas this type of heater is relatively expensive in it initial installation, it acts as a self limiter and does not require a thermostat to maintain a safe temperature limit.

Figure 4:
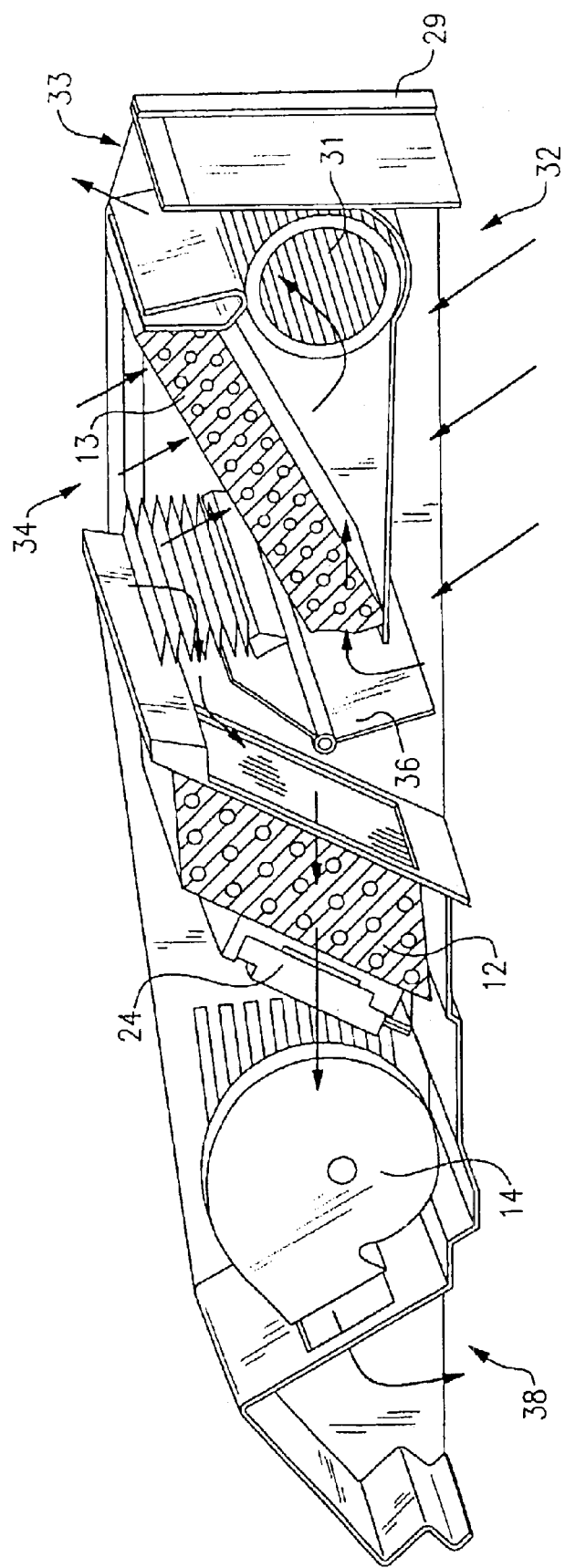
FIG. 4 is a cut away perspective view of a module in accordance with a preferred embodiment of the invention.

Referring now to FIG. 4, the module is shown with the various components as described hereinabove enclosed within a housing 29 and including a condenser fan 31. Also shown are the various openings in the housing 29, including a return air opening 32, a condenser outlet opening 33 and a condenser/fresh air intake opening 34. A fresh/return/exhaust air flap 36 is provided between the condenser coil 13 and the evaporator coil 12 to control the mix of air passing to the evaporator coil 12, depending on the particular demands of the system, as well as the existing ambient conditions. The air flow pattern, as indicated by the arrows, is thus controlled by the condenser fan 31, the evaporator fan 14 and the position of the air flap 36. As the return air enters the return air opening 32, it is caused to flow out the condenser outlet air opening and/or through the evaporator coil 12 depending on the position of the air flap 36. Similarly, the fresh air coming in the intake opening 34 passes through the condenser coil 13 and then out the condenser outlet air opening 33 and/or, depending on the position of the air flap 36, it is allowed to pass through the evaporator coil 12. Thus, with the use of the air flap 36 it is possible to have all of the return air pass through the condenser air outlet opening 33, with all fresh air passing into the air intake opening 34 and then through the evaporator coil 12, or when the flap 36 is placed in the other extreme position, all of the return air passes through the evaporator coil 12 and all of the fresh air entering the air intake opening 34 passes through the condenser coil 13 and out the condenser outlet air opening 33. A more likely operating condition, however, is an intermediate position of the air flap 36 wherein a selective mix of return air and fresh air are passed through the evaporator coil 12.

As will be seen, a filter 37 is positioned in the air flow stream which enters the fresh air intake opening 34 and passes through the evaporator coil 12. Its purposes is to filter out any debris that may be in the air stream entering the air intake opening 34. After passing through the evaporator coil 12, the conditioned air is caused to flow by the evaporator blower 14 out a supply air opening 38 as shown.

Considering now the manner in which the module 11 is positioned on the rooftop in such a way as to interface with the existing air path openings on the rooftop, reference is made to FIGS. 5a–5c. As will be seen, the position of the various openings on a bus can vary substantially from application to application. For example, in a wide bus application as shown in FIG. 5a, the supply air duct 39 is located near the outer side of the bus, whereas the return air duct 41 is disposed at a substantial distance from the longitudinal center line thereof. In a narrow bus application as shown in FIG. 5b, the supply air duct 42 is moved a small distance inwardly from the outer side of the bus, and the return air duct is located adjacent the longitudinal centerline as shown. In a curved-roof bus as shown in FIG. 5c, the supply air duct 44 is moved slightly more inwardly from the outer side of the bus, and the return air duct 46 is located in an intermediate position, somewhat outwardly of the longitudinal centerline, but not as far as for a wide bus application.

Of course, in all of the bus applications, a balanced arrangement is provided wherein each side of the bus is provided with both a supply air duct and a return air duct, in a substantially mirror image arrangement as shown. Thus, the modules are placed in back-to-back relationship, with the space therebetween being varied to accommodate the individual application requirements. For example, for the wide bus application of FIG. 5a, there is a substantial space between the two modules wherein for the narrow bus application of FIG. 5b, they are substantially in an abutting relationship. For the curved roof bus application, they are somewhat angled from a true horizontal position, with the spacing therebetween being at an intermediate degree as shown. It should be understood that the three types of installations shown are presented as a sampling of the possible installation requirements, and there are also others that have heretofore required unique designs in order to meet the particular requirements. The present design, on the other hand, provides a single module which will meet the needs of all of the various applications of rooftop air conditioners.

As will be seen, the supply air opening is relatively small, and in each of the three cases described above, the module 11 is placed in such a position that the supply air opening 38 is located substantially over the individual supply air ducts 39, 42 and 44. The return air opening 32, on the other hand is relatively large and therefore can accommodate the various positions of the return air ducts 41, 43 and 46 as shown.

Figure 6C:
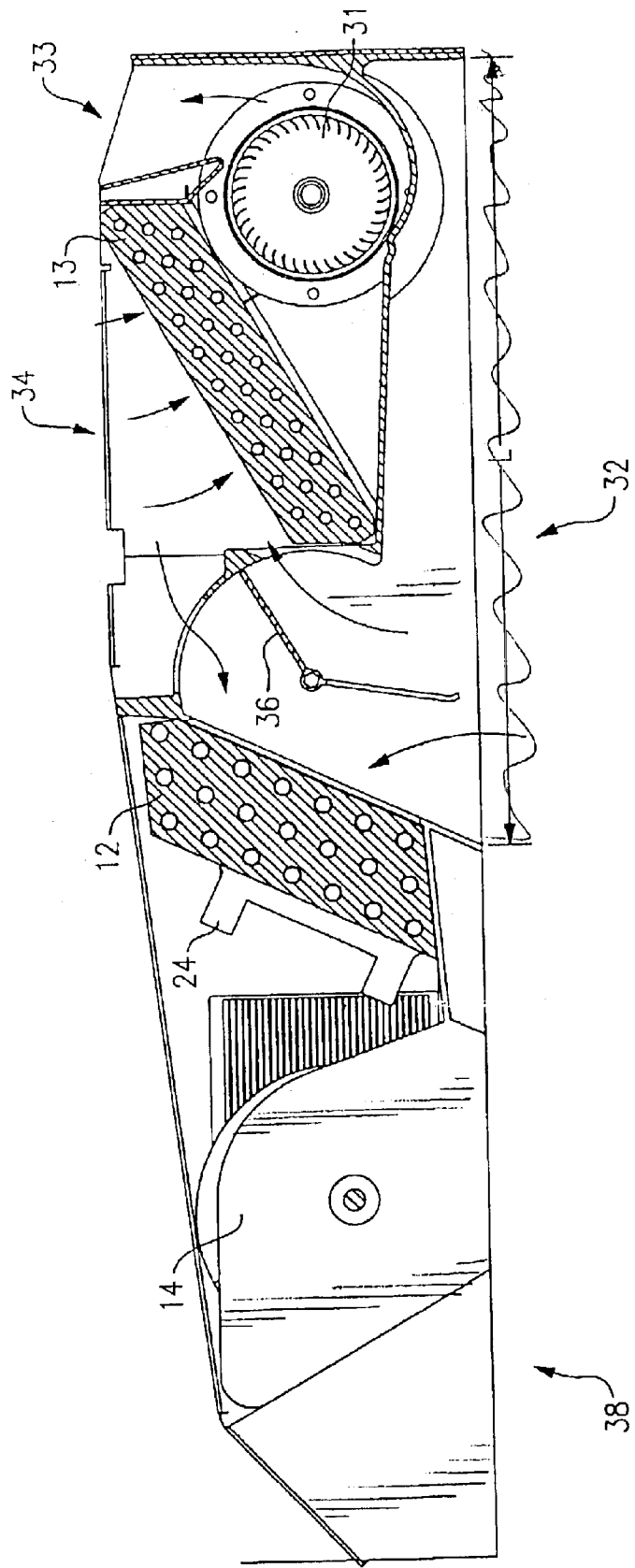

In order to describe the length (i.e., the extent that it spans a lateral dimension of the bus), of the return air opening 32, it is necessary to briefly review the design features, including the exhaust air flap 36 as shown in FIGS. 6a–6c. In FIG. 6a, the fresh/return/exhaust air flap 36 is placed in such a position that all of the return air coming into the return air opening 32 passes through the evaporator coil 12 as shown, and with all of the fresh air entering the fresh air intake opening 34 passing through the condenser coil 13 and out the outlet air opening 33. In FIG. 6b, the fresh/return/exhaust air flap 36 is placed in the other extreme position wherein none of the return air passing into the return air opening 32 is passed to the evaporator coil 12 and the only air entering the evaporator coil 12 is the fresh air, a portion of which passes through the evaporator coil 12 and a portion of which passes through the condenser coil 13 as shown. In FIG. 6c, the fresh/return/exhaust air flap 36 is placed in an intermediate position wherein a portion of the return air passes through the evaporator coil 12, and a portion thereof is diverted to pass through the condenser coil 13. In this case, fresh air is also diverted from the air intake opening 34 and mixed with the return air as it passes through the evaporator coil 12.

In all of the three positions of the fresh/return/exhaust air flap 36 as shown, and for any other position thereof, the return air opening 32 of the module is rather extensive in length, with the length thereof being represented by the designation $L_1$. It is because of this substantial length $L_1$, of the return air opening 32 that the module 11 can accommodate the various installation requirements as described hereinabove.

The relative size of $L_1$, can be established by a convenient comparison with the overall length $L_2$ of the module. That is the ratio of longitudinal length $L_1$, of the opening to the longitudinal length $L_2$ of the module is $$\frac{18.64 \text{ inches}}{37.80 \text{ inches}} = .493$$

It is therefore greater than 45% and close to 50%. Another reference point is the width of the bus rooftop or more appropriately, the half width of a bus. A wide bus has a half width of approximately 51 inches and a narrow bus has a half width of approximately 48 inches. Thus, for a wide bus (FIG. 5a), the ratio of the length $L_1$ to the bus half width $L_3$ (i.e. the dimension between a longitudinal centerline thereof and the outer side of the bus) is $$\frac{18.64 \text{ inches}}{51 \text{ inches}} = .365$$

For a narrow bus (FIG. 5b) it is $$\frac{18.64 \text{ inches}}{37.80 \text{ inches}} = .388$$

In each case, it is therefore greater than 36%.

Figure 7:
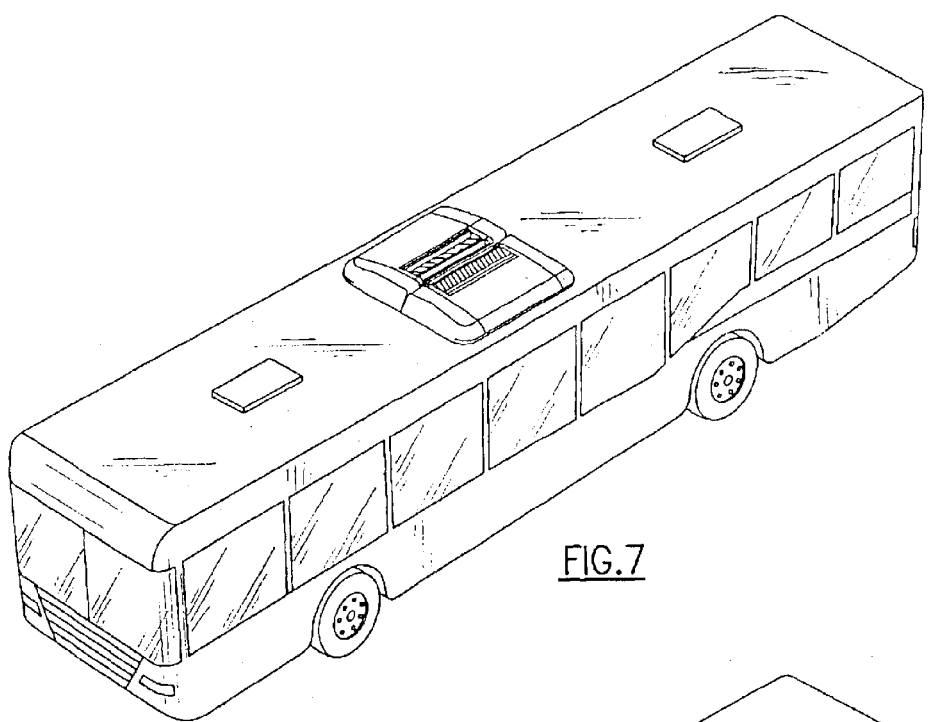
FIG. 7 is a perspective view with a pair of modules installed in accordance with a preferred embodiment of the invention.
Figure 8:
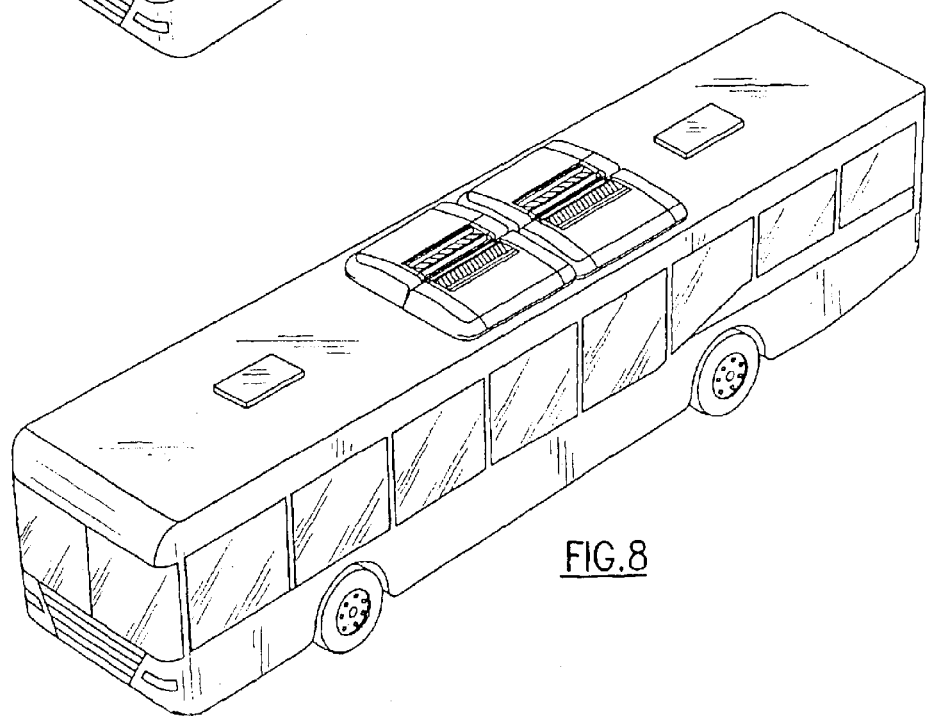
FIG. 8 shows a perspective view of four modules installed in accordance with the invention.
Figure 9:
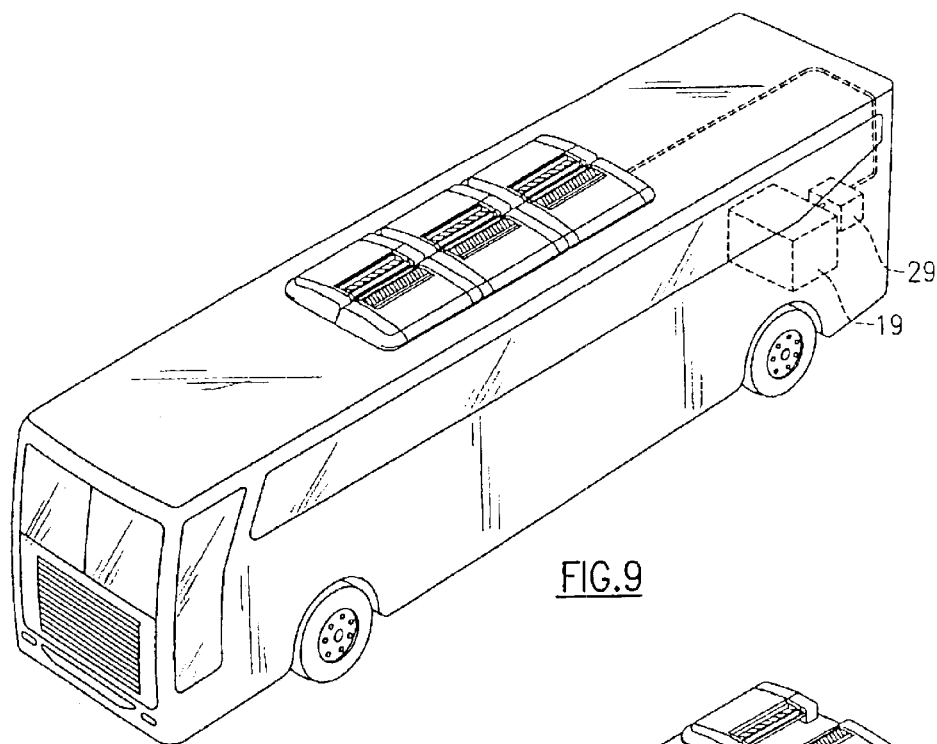
FIG. 9 is a perspective view of six modules installed in a bus in accordance with the invention.
Figure 10:
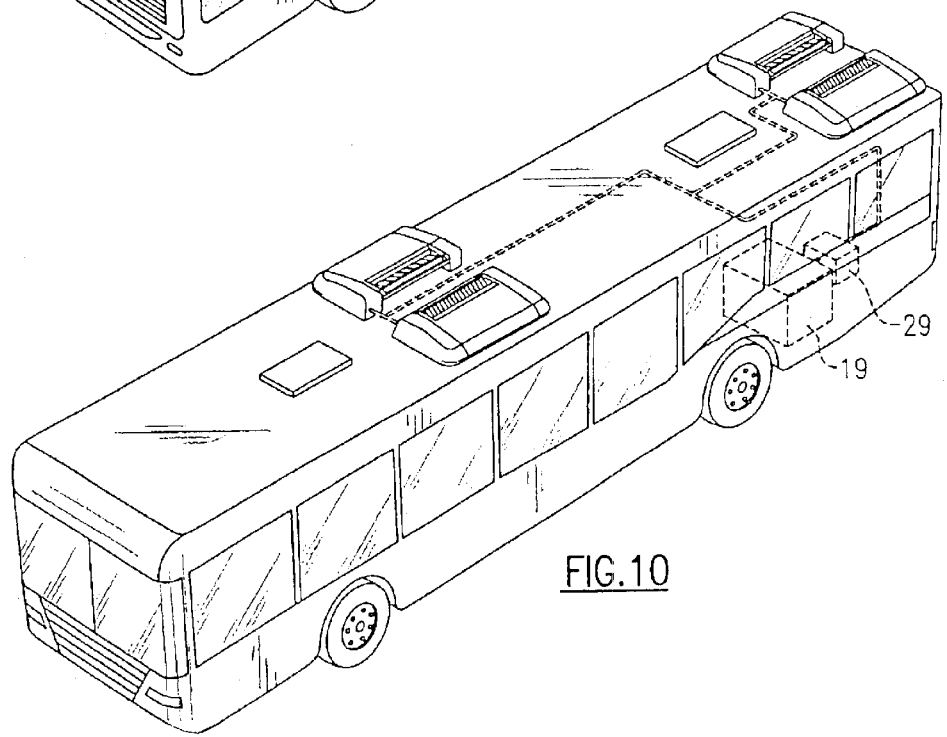
FIG. 10 is a perspective view of an alternative installation of four modules on a bus rooftop.

In FIGS. 7–10, there is shown various pairings of modules as installed on various locations of the bus rooftop. In FIG. 7, a pair of modules are positioned in back-to-back relationship near the longitudinal center of the bus. In FIG. 8, there are two such pairings (i.e., four modules) in back-to-back relationship near the longitudinal center of the bus, and in FIG. 9 there are shown three such pairings. In FIG. 10, there is shown a pair of modules in back-to-back relationship, but with a substantial space therebetween, both near the longitudinal center of the bus and near the trailing end thereof with all being aligned along lines parallel to the longitudinal centerline of the bus. In addition to those shown, it should be understood that various other installations can be accommodated with the module as described herein.

We claim:

1. A vehicle air conditioning system comprising:

an electrical generator driven by an engine;
a self-contained air conditioner module comprising:
   a condenser;
   an expansion device;
   an evaporator,
   a condenser blower driven by an AC electric motor;
   an evaporator blower driven by an AC electric motor,
   an electric heater located in air flow relation to said evaporator and said evaporator blower, and
   a power controller for receiving AC electrical power from said generator and providing AC electrical power to each of said condenser blower motor, said evaporator blower motor, and said electric heater;
wherein said power controller comprises:
   a rectifier to convert said AC power to DC power; and
   an inverter for inverting said DC power to inverter output AC power. said inverter output AC power being supplied to said condenser blower motor, said evaporator blower motor, and said electric heater.

2. The vehicle air conditioning system of claim 1 wherein said engine is the prime mover of the vehicle.

3. The vehicle air conditioning system of claim 2 wherein said self-contained air conditioner is adapted to be mounted on the roof of said vehicle.

4. The vehicle air conditioning system of claim 1 wherein said module further includes a hermetic compressor having an integrated AC electric driving motor, and further wherein said power controller provides electrical power to said driving motor.

5. A vehicle air conditioning system comprising:

an electrical generator driven by an engine;
two or more self-contained air conditioning modules, each of said modules comprising:
   a condenser;
   an expansion device;
   an evaporator;
   a condenser blower driven by an AC electric motor;
   an evaporator blower driven by an AC electric motor;
   a power controller for receiving AC electrical power from said generator and providing AC electrical power to each of said compressor motor, said condenser blower motor, and said evaporator blower motor,
wherein said power controller comprises:
   a rectifier to convert said AC power to DC power; and
   an inverter for inverting said DC power to inverter output AC power, said inverter output AC power being supplied to said compressor motor, said condenser blower motor, said evaporator blower motor, and said electric heater.

6. The vehicle air conditioning system of claim 5, wherein said engine is the prime mover of the vehicle.

7. The vehicle air conditioning system of claim 5 wherein each of said modules are configured to be mounted on the rooftop of said vehicle.

8. The vehicle air conditioning system of claim 7 wherein said modules are mounted in back-to-back relationship on either side of a longitudinal centerline of the vehicle.

9. The vehicle air conditioning system of claim 7 wherein said modules are mounted in parallel back-to-back relationship, along lines parallel to the longitudinal centerline of the vehicle.

* * * * *

UNITED STATES PATENT AND TRADEMARK OFFICE
CERTIFICATE OF CORRECTION

PATENT NO. : 6,925,826 B2
DATED : August 9, 2005
INVENTOR(S) : Andreas Hille, Robert C. Reimann and Berlin Czechowicz It is certified that error appears in the above-identified patent and that said Letters Patent is hereby corrected as shown below:

Column 6,
Line 50, the number "37.80" is incorrect, please replace with the number -- 48 --.

Signed and Sealed this

Thirteenth Day of December, 2005

JON W. DUDAS
*Director of the United States Patent and Trademark Office*